3,041,132
SPINNING OF VISCOSE
Edward M. Simon, Jr., Metuchen, N.J., assignor to Atlas Chemical Industries Inc., Wilmington, Del., a corporation of Delaware
No Drawing. Original application Jan. 31, 1955, Ser. No. 485,347, now Patent No. 2,941,892, dated June 21, 1960. Divided and this application Jan. 28, 1960, Ser. No. 5,113
8 Claims. (Cl. 18—54)

This invention relates to the regeneration of cellulose from viscose solutions and more particularly to the manufacture of regenerated cellulose articles such as yarn and film from viscose, and is a division of my copending application, Serial No. 485,347, and now U.S. Patent No. 2,941,892.

It is an object of the invention to provide a process for producing regenerated cellulose yarn having novel and desirable properties.

Another object of the invention is to provide a process for producing high-tenacity regenerated cellulose yarn.

A further object is to provide a process whereby unripened viscose can be spun to produce a high-tenacity, fatigue-resistant regenerated cellulose fiber having improved soil and abrasion resistance.

A still further object is to provide novel viscose compositions adapted to the spinning of high-tenacity regenerated cellulose yarns.

The above and other projects will become more apparent in the course of the following description of the invention and in the appended claims.

The above objects are accomplished in accordance with the invention by incorporating in the viscose solution to be spun a compound which is a polyhydric alcohol, containing from 3 to 6 carbon atoms and at least ⅔ as many hydroxyl groups as carbon atoms, a hydroxyethyl or polyhydroxyethyl ether of such an alcohol, or a polyoxyethylene ether of such an alcohol. The said compound may be represented by the generic formula

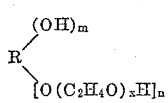

wherein R is the hydrocarbon residue of a polyhydric alcohol containing from 3 to 6 carbon atoms and at least ⅔ as many hydroxyl groups as carbon atoms, m and n each has any value from 0 to 6 such that their sum is equal to the number of hydroxyl radicals in said polyhydric alcohol, and x has any value from 0 to 20. An exemplary list of compounds so-defined includes glycerol, propylene glycol, pentaerythritol, erythritol, xylitol, the several desoxy hexitols, sorbitol, mannitol, hydroxyethyl glycerol, hexahydroxyethyl sorbitol, penta hydroxyethyl mannitol, the polyoxyethylene ether of glycerol containing 50 oxyethylene groups, the polyoxyethylene ether of sorbitol containing 100 oxyethylene groups, the polyoxy ethylene ether of pentaerythritol containing 60 oxyethylene groups, the polyoxyethylene ether of mannitol containing 120 oxyethylene groups, and the like.

The defined compounds are soluble in viscose solutions and may be incorporated therein at any stage of the viscose process after the cellulose is dissolved. For effective results, from about 0.75% to about 4% by weight of the polyhydric alcohol or ether-alcohol based on the weight of cellulose in the solution is employed. The composition of the viscose may vary widely as is known in the art. It may be formed from cotton linters or from wood pulp as the source of cellulose, and may contain from 4% to 10% of cellulose in a solution containing from 4% to 8% of alkali metal hydroxide. The amount of carbon disulfide used in xanthation may be from 25% to 50%.

The viscose solutions of the invention, i.e., those containing the modifying polyhydroxy compounds hereinbefore defined, may be employed in the normal manner for the production of regenerated cellulose films, and yarns. Suitable spinning or regenerating baths contain sulfuric acid, zinc sulfate and sodium sulfate. Preferred spinning baths contain from 4% to 12% sulfuric acid, from 1% to 10% zinc sulfate and from 13% to 25% sodium sulfate.

The following non-limiting examples illustrate the preparation of viscose solutions and production of regenerated cellulose yarn therefrom, both in accordance with the invention.

*Example I*

A cotton linters viscose containing 7% cellulose and 6.6% sodium hydroxide is prepared in the conventional manner except that during the dissolution of the xanthated cellulose in the aqueous sodium hydroxide, 1% by weight, based on the cellulose content, of the polyoxyethylene ether of sorbitol containing 100 oxyethylene groups per mol is added and thoroughly dispersed therein. The resulting viscose solution is spun in an unripened state into a bath containing 7% sulfuric acid, 8% zinc sulfate and 17% sodium sulfate. The spinning is carried out on conventional spinning equipment to produce a regenerated cellulose yarn of high tensile strength which is resistant to abrasion.

*Example II*

Viscose containing 7% cellulose, 6% sodium hydroxide and 0.055% sorbitol is prepared as follows: Alkali cellulose aged to obtain a suitable viscose viscosity is xanthated with 36% carbon disulfide. The xanthate crumbs are dissolved in aqueous solution containing sodium hydroxide solution and sorbitol in amounts to furnish the indicated percentages. After mixing, the viscose is filtered, deaerated and finally spun in an unripened state. The coagulating and regenerating bath contains 8% sulfuric acid, 8% zinc sulfate and 23% sodium sulfate. Yarns with smooth surface and high tenacity are obtained.

*Example III*

A wood pulp viscose containing 7% cellulose and 6.6% sodium hydroxide is prepared in the conventional manner except that 3%, based on the weight of cellulose, of the polyoxyethylene ether of mannitol containing 20 oxyethylene groups per mol is incorporated therein during dissolution of the xanthate in the alkali solution. After filtration and deaeration of the prepared viscose the solution is ripened for 36 hours and spun into a regenerating bath containing 8% sulfuric acid, 8% zinc sulfate and 23% sodium sulfate. The resulting yarn is fatigue resistant and of low soil retention.

In the illustrative examples, sorbitol and polyoxyethylene hexitols have been employed as the viscose modifying agents. Similar improved results may be obtained by employing any of the polyhydric alcohols and/or their oxyethylene or polyoxyethylene ethers as defined hereinbefore.

What is claimed is:

1. A method of producing regenerated cellulosic structures which comprises spinning a viscose solution containing from 0.75% to 4.0%, based on the weight of the cellulose, of a polyoxyethylene ether of a hexitol, into an acid regenerating bath containing sulfuric acid, zinc sulfate and sodium sulfate.

2. A method of producing regenerated cellulosic structures which comprises spinning into an acid regenerating bath containing sulfuric acid, zinc sulfate and sodium sulfate a viscose solution containing from 0.75% to 4.0% based on the weight of the cellulose, of a polyoxyethylene ether of sorbitol containing from 1 to 100 oxyethylene groups per mol of sorbitol.

3. A method of producing regenerated cellulosic structures which comprises spinning a viscose solution containing from 4.0% to 10.0% cellulose, from 4.0% to 8.0% alkali metal hydroxide and from 0.75% to 4.0%, based on the cellulose, of a polyoxyethylene ether of a hexitol containing up to 20 oxyethylene groups in each polyoxyethylene chain into an aqueous sulfuric acid spinning bath containing 4.0% to 12.0% sulfuric acid, 1.0% to 10.0% zinc sulfate and 13.0% to 25.0% sodium sulfate.

4. A method of producing regenerated cellulosic structures as in claim 3 wherein said hexitol is sorbitol.

5. A method of producing regenerated cellulosic structures which comprises spinning into an acid regenerating bath containing sulfuric acid, zinc sulfate and sodium sulfate a viscose containing in solution a polyoxyethylene ether of a 3 to 6 carbon polyhydric alcohol containing up to 20 oxyethylene groups per hydroxyl radical of said alcohol, the said polyhydric alcohol containing at least ⅔ as many hydroxyl groups as carbon atoms.

6. A method of producing regenerated cellulosic structures as in claim 5 wherein said polyhydric alcohol is sorbitol.

7. A method of producing regenerated cellulosic yarns from viscose which comprises spinning into an acid regenerating bath containing sulfuric acid, zinc sulfate and sodium sulfate a viscose containing in solution from 0.75% to 4.0%, based on the cellulose content, of a polyoxyethylene ether of a 3 to 6 carbon polyhydric alcohol containing up to 20 oxyethylene groups per hydroxyl radical of said alcohol, the said polyhydric alcohol containing at least ⅔ as many hydroxyl groups as carbon atoms.

8. A method of producing regenerated cellulosic yarns as in claim 7 wherein said polyhydric alcohol is sorbitol.

References Cited in the file of this patent

UNITED STATES PATENTS 2,519,227    Collins _____ Aug. 15, 1950

OTHER REFERENCES

Elod et al.: Reyon Zellwolle und Andere Chemiefasern, Jahrg. 1955, No. 33, pages 322–323.